United States Patent

Nightingale et al.

[15] 3,688,798
[45] Sept. 5, 1972

[54] VALVES

[72] Inventors: Douglas Daniel John Nightingale, St. Albans; Nigel Payne, Knebworth, both of England

[73] Assignee: Imperial Chemical Industries Limited, London, England

[22] Filed: Jan. 5, 1971

[21] Appl. No.: 103,990

Related U.S. Application Data

[63] Continuation-in-part of Ser. No. 31,854, May 1, 1970, which is a continuation of Ser. No. 590,236, Oct. 28, 1966, abandoned.

[52] U.S. Cl..............................137/625.47, 251/189
[51] Int. Cl.................................................F16k 11/00
[58] Field of Search.......137/625.47, 625.48, 625.41; 251/187, 189

[56] References Cited

UNITED STATES PATENTS

| | | | |
|---|---|---|---|
| 3,043,555 | 7/1962 | Breher | 251/187 |
| 2,766,771 | 10/1956 | Wenzel | 137/625.46 X |
| 3,122,168 | 2/1964 | Wright | 137/625.48 |
| 3,190,584 | 6/1965 | Gire et al. | 137/625.46 X |
| 3,384,121 | 5/1968 | Spencer | 137/625.41 |
| 3,447,569 | 6/1969 | Kreuter | 251/189 X |
| 3,570,537 | 3/1971 | Kelly | 137/625.41 X |

*Primary Examiner*—Samuel Scott
*Attorney*—Cushman, Darby & Cushman

[57] ABSTRACT

There is provided a valve spindle having a closure portion for occluding a fluid passage within a valve body. The spindle has an annular portion which is deformable by application of pressure thereto, and distending means are located within the spindle for distending the deformable portion radially outwards to contact the inner wall of the valve body and form a gland seal. The outer surfaces of the deformable portion and of the closure portion form a continuous unitary outer surface composed of a chemically inert polymer, preferably PTFE. Adjustment of the distending means may be accomplished without disturbing the effectiveness of the operating gland seal.

19 Claims, 29 Drawing Figures

VALVES

This application is a continuation-in-part application of co-pending U.S. application Ser. No. 31,854, filed on May 1st 1970, entitled Gland Seal, which was a continuation application of U.S. application Ser. No. 590,236, filed on Oct. 28th 1966, entitled Gland Seal, now abandoned.

This invention relates to valves having a novel gland seal.

Polytetrafluoroethylene (PTFE) seals in which a collar of PTFE is inserted between the outer cylinder and the moving element are known and have been used where a chemically inert gland seal is required. The PTFE seals must be machined accurately to provide a good seal, and being a close fit in the cylinder are easily damaged during assembly or removal for cleaning. During use, the PTFE tends to creep, reducing the efficiency of the seal, and a second collar (e.g., of rubber) may therefore be required to maintain the seal, but the advantage of the chemical inertness of the PTFE is then lost. The gland seal of the present invention does not require such accurate machining of the moving parts and remains effective without the need of a second sealing device of a less chemically resistant material.

According to the present invention, we provide a valve having a closable passage for conveying fluid therethrough, and comprising a valve body having an annular bore and a valve spindle formed from a chemically inert polymer slidably located in said annular bore; the spindle having a closure portion comprising a portion of the outer surface of the spindle which is arranged to close said passage, and sealing means for providing a seal between the spindle and the annular bore; the sealing means comprising a radially deformable outer annular segment of the spindle, distending means within said annular segment for adjustably distending it radially outwards to contact the bore wall and form a seal, said closure portion and said annular segment being relatively positioned such that said closure portion is isolated from the distending means by said seal so as to prevent contamination of said distending means by fluid, and adjustment means comprising a mandrel and an adjustable compression member engaging with said mandrel; said distending means being distendable by movement of said compression member whereby adjustment of said compression member with respect to said mandrel toward said distending means effects axial compression, and consequential radial distension of said distending means.

The annular segment should be sufficiently pliable to follow the contour of any irregularities in the bore of the valve body, under the influence of pressure from the distending means. It is also advantageous to employ a material having a low coefficient of friction in order that the use of lubricants may be avoided. Where the valve is to be employed for controlling the flow of chemically reactive fluids, a high chemical inertness is also advisable. Thus solid inert low-friction fluorine-containing polymers are particularly suitable for forming the deformable annular segment of the valve spindle. The fluorine-containing polymer may contain in particular polytetrafluoroethylene (PTFE), polychlorotrifluoroethylene, polyvinylfluoride, polyvinylidene fluoride and copolymers of tetrafluoroethylene containing a minor proportion of ethylene or hexafluoropropene. The fluorine-containing polymer may form part of a composition in which it is blended with other copolymers or filled with such materials as glass-fibers, mica or metal oxides to improve the resistance to wear. Any additional material may be employed provided that the outer surface of the spindle remains sufficiently pliable to form a good seal against the valve body. In this respect, the preferred polymeric material for forming the pliable outer layer of the spindle is PTFE and in particular a material which contains not more than 40 percent by volume of added filler.

The present method of forming a seal is particularly suited to the provision of a gland seal in a nose-operated valve. Accordingly we now provide a valve spindle of a chemically inert polymer slidably located in an annular bore in a valve body having a valve seat; said spindle having a solid nose portion at one end thereof engaging said valve seat in said valve body to prevent passage of fluid medium through said valve seat when the valve is closed, and sealing means providing a gland seal between said spindle and the annular bore of said valve body; said sealing means comprising a radially deformable outer annular segment of said spindle, a hollow portion within said spindle having an opening only at the end of said spindle remote from said nose portion, distending means within at least part of said hollow portion of said spindle for distending said outer annular segment radially outwards to contact said annular bore wall of said valve body and form a gland seal, said outer annular segment being positioned in said bore between the fluid medium to be sealed by the gland seal and the opening of said spindle so that said outer annular segment prevents said fluid medium for entering said opening so that the said fluid medium does not contact said distending means, and adjusting means comprising a mandrel and an adjustable sleeve engaging with said mandrel; said distending means being distendable by movement of said sleeve whereby adjustment of said sleeve with respect to said mandrel towards said distending means effects axial compression, and consequential radial distension of said distending means; said adjusting means being adjustably operable through said spindle opening so that it is adjustable from outside of said spindle without disturbing the effectiveness of the operating gland seal.

The distending means conveniently comprises a length of elastomeric tubing which is coaxially mounted n the mandrel. A wide range of elastomeric substances are suitable for the distending means as is sealed from contamination within the chemically inert polymer spindle. Rubber is very suitable, being both inexpensive and readily available.

Our preferred method of applying the compressive forces to the distending means is to provide the mandrel with an integral enlargement, the distending means being located between said enlargement and the adjustable sleeve.

To facilitate the adjustment of the distension, one end of the mandrel may be provided with engagement means which engage with the nose portion whereby rotation of the mandrel with respect to the nose portion during adjustment of the adjustable sleeve is prevented. Thus the mandrel may be fastened to the nose, for example, by engagement means comprising a screw thread which engaged with a corresponding screw thread in the nose portion. Alternatively, the enlargement on the mandrel may be non-circular, and engage with a correspondingly shaped hole therefor in the nose portion. Of these methods we prefer to use the screw thread, this being readily formed in the nose and on the mandrel. When the mandrel so engages the nose, it is convenient to extend the sleeve beyond the end of the mandrel remote from the nose and to provide the end of the sleeve with a slot for engaging a screw-driver. Adjustment is thereby carried out very readily. Alternatively, however, it may at times be more convenient to employ only a very short form of sleeve such as a nut. Thus for example, the nut may be embedded within the nose of the spindle, being a close fit to prevent rotation, and a mandrel in the form of a bolt, carrying a length of rubber tubing, being inserted into the hollow portion so as to engage the nut. Adjustment of the distension may then be effected by rotation of the bolt with respect to the spindle. It is preferable to provide a PTFE bush between the rubber tubing and the bolt so as to reduce the transmission of torsional forces to the annular segment.

The compression may be applied either before or after the spindle is inserted into the body. It is, however, preferred to insert the spindle into the bore, and then to distend the annular segment to press against the bore walls thus forming the seal. This avoids damage to the soft sealing segment during assembly. The ability to adjust the distension of the assembled valve is of particular advantage when the sealing unit must frequently be removed from the valve body, for example during cleaning. PTFE will creep with usage and the seal will tend to become less effective, but by being able to adjust the distension of the annular segment while the valve is assembled, a good seal may be maintained in spite of this tendency. Furthermore, where the valve is used at elevated temperatures, operation of the valve may become stiffer as the temperature is raised. This is most noticeable in valves having a distending means comprising a relatively long length of rubber tubing. This stiffness may, however, be removed by adjustment of the distension while the valve is in use. However, we have found that this problem may be substantially overcome by employing a sealing means in which the compressive force is applied to the distending means through a compression spring which may conveniently be mounted on the mandrel between the elastomeric tubing and the enlargement on the mandrel, or between the elastomeric tubing and the adjustable sleeve, as preferred.

When a control or stop valve of inert material is required for chemical or physical processes in a laboratory, a combination of glass and PTFE is particularly useful. Glass being rigid forms the body and seat of the valve and the more flexible and soft PTFE is used for the plunger, which, pressing on the seat, conforms readily to its profile and effectively closes the orifice. The exceptionally low coefficient of friction of PTFE is of great value since opening and closing of the valve necessitates a sliding movement and the use of contaminating lubricants is avoided. Other rigid materials such as metals, e.g., stainless steel are also very suitable for forming the body of the valve, particularly for such applications as analytical apparatus used at elevated temperatures and pressures.

In order to obtain an efficient seal, it is not necessary to have a broad expanded zone. Thus in a PTFE valve spindle having a diameter of about 7.5 mm and a wall thickness of the annular segment of approximately 0.75 mm, an expanded zone of only about 3 mm will produce an efficient seal.

However, in contrast, the expanded zone may be very considerably widened while still producing an efficient seal, and therefore is also very suitable for use in a radial port valve where the side of the spindle blocks the ports to provide closure of the valve. In such cases the fluid passage may be provided in the form of an indentation in the surface of the spindle, arranged to inter-connect two ports simultaneously in the open valve. We have now found that by using a resilient distending means such as the elastomeric tubing described above, we can obtain an efficient seal over a sufficiently large area to enable a plurality of individual flow passages to be used simultaneously by forming the passages as indentations in the surface of the annular segment, the passages being effectively isolated by the seal obtained between the distending segment and the bore-wall.

In plant and apparatus for handling chemical fluids, particularly in analytical apparatus, it is often necessary to operate more than one valve in changing from one stage of a process to the next, these valves may even be required to be operated simultaneously. Simultaneous action may be obtained by ganging banks of the valves, but this is cumbersome and may be subject to lost motion between the valves. This system is also generally unsuitable where the valves are to be maintained in an oven at a controlled temperature. Valves having a plurality of flow passages, such as multiple valves having banks of valve units within the same valve and using a common valve body and spindle, are generally to be desired, but the difficulty associated with such valves is that of producing efficient sealing between the body and the spindle over the length required for the banks of valve units, and generally in providing a seal against fluid flow from one flow passage to an adjacent flow passage.

According to a further aspect of the invention, we therefore provide a valve spindle of a chemically inert polymer slidably located in an annular bore in a valve body having a plurality of radially disposed ports communicating with the bore; said spindle having a sealing means comprising a radially deformable outer annular segment of said spindle encompassing a hollow portion having an opening at at least one end, distending means within at least part of said hollow portion of the spindle for distending said annular segment radially outwards to contact the annular bore wall of the valve body and form a seal, and adjusting means comprising a mandrel and an adjustable compression member engaging with said mandrel; said distending means being distendable by movement of said compression member whereby adjustment of said member with respect to the mandrel towards said distending means effects axial compression and consequent radial distension of said distending means, said adjustment means being adjustably operable from outside said spindle without disturbing the effectiveness of the operating seal, the outer surface of said outer annular segment having at least two indentations disposed to provide independent fluid flow-passages for inter-connecting selected ports.

If desired, the hollow portion of the spindle may have an opening at one end only, with provision for the mandrel to engage the closed end in the same manner as that described above in relation to the nose-operated valves. However, since it is not necessary to provide a nose in the radial-port valve, we generally prefer the hollow portion to be open at both ends. The adjustment means may then be arranged to be adjustably operable from whichever end is most convenient for any particular application.

The distending means and adjustment means may be essentially the same as that described for the nose-operated valve, except that they are generally extended longitudinally to distend a wider annular segment against the bore wall. Thus the resilient distending means is again conveniently a length of elastomeric tubing which is coaxially mounted on the mandrel. Again our preferred method of applying the compressive force to the distending means is to provide the mandrel with an integral enlargement, the distending means being located between said enlargement and the adjustable compression member. Where the hollow portion is open at both ends, however, the valve is particularly suited to the provision of two adjustable compression members, the distending means being located between the two compression members.

The adjustable compression member may have screw threads which engage with screw threads on the mandrel. It may, for example, be an internally threaded sleeve, particularly a nut, or the sleeve may be enlarged to provide a boss having operating handles connected thereto and similarly screwed directly onto the mandrel. While there are various ways of applying the compressive force to the distending means, for reliable operation all the axial forces produced as a reaction to the compressive force should be applied to the mandrel and not to the pliable outer layer. As an alternative to the screwed sleeve, the sleeve may be provided with an enlargement, and be arranged to form a bush between the mandrel and the elastomeric tubing, the bush and the mandrel being joined by a multi-position bayonet-type fitting.

The use of a resilient distending means, a central mandrel and means for adjustment of the distending forces, enables a valve to operate efficiently with a plurality of valve units arranged along the valve in a series of banks. We found that we could make multiple bank valves having as many as six or more banks of ports arranged along the valve body with corresponding inter-connecting channels formed in the surface of the spindle, and a biasing means comprising rubber tubing adjustably supported on a mandrel, and obtain a seal between the spindle and the bore which appeared to be as effective as that of similar valves having only one bank of ports.

Thus a particular form of multiple valve for which a construction according to the present aspect of the invention is particularly suited is a valve having at least two banks of radially disposed ports, each bank comprising at least two of said ports, and the surface of the annular segment of the spindle being provided with indentations disposed to provide flow passages for interconnecting selected ports of the same bank, the indentations associated with any one bank of ports being separated from the indentations associated with any other bank of ports by the outer surface of the segment forming a seal in the bore between the banks of ports. Thus each bank of ports and its corresponding indentations in the spindle, is sealed from adjacent banks and operates as a separate valve unit. By employing a common spindle and body, the valve units are operated simultaneously.

By making each valve unit identical with the other valve units in respect of the number and position of the ports and indentations, each valve unit will operate in the same manner and at the same time as the other valve units. However, by positioning the ports in respect to the corresponding indentations of any valve unit differently from the positions in other valve units, various combinations of action, e.g., sequential operation, may be achieved as desired.

It is not essential, however, for the banks of ports to be inter-connected in isolation. Indeed, where complicated switching operations are required, the ability to be able to cross from one bank of ports to the next provides an opportunity to utilize the complicated combination of possible inter-connections available, particularly when the ports themselves are staggered. Our preferred form of multiple valve is therefore one in which the valve body has a plurality of ports disposed both along and around the body, the spindle having a plurality of indentations each arranged to be brought into alignment with two or more of the ports simultaneously by a sliding the spindle within the bore, preferably with a rotary motion. The indentations may be channels of various lengths, and various directions as required. They may be straight channels or may, if so required, be in the form of broader depressions covering a wider area. However to reduce retention of excess fluid as the valve is operated, we prefer to use channel shaped indentations taking the shortest path between two ports inter-connected thereby.

In the radial-port valves of the invention, the deformable annular segment is held against the bore of the valve body by the resilient distending means. The resilient member may therefore tend to press the annular segment into the ports. For example, where the outer layer is formed from PTFE, it may undergo cold flow, otherwise termed creep, into the ports. Rotation of the spindle may then cause the outer layer to tear. This tendency, which is most noticeable at elevated temperatures, may be reduced by the provision of blind indentations which are so disposed that they are aligned with closed ports, that is ports from which the indentations providing the flow-passages have been disaligned. By the term "blind indentation" is meant an indentation within the surface of the spindle which by reason of its size, shape or position, communicates only with that port with which it is aligned. The blind indentations may have the same shape as the ports, but to reduce the danger of operator error in alignment of blind indentations with the ports, it is preferable to elongate the blind indentations in the direction of the movement of the spindle with respect to the body. The amount of elongation provided, will normally be limited by the dimensions of the valve components. Thus, the indentations must not be elongated sufficiently to allow communication with other ports or with the passage for the through-flow of fluid. Valve spindles provided with blind indentations are described and claimed in our copending application corresponding to our United Kingdom application No. 63516/69.

The valve body may be formed from any rigid material such as glass or metal. The preferred fluorine-containing polymers for the outer layer of the spindle are resistant to attack by solvents at elevated temperatures and the use of grease and other contaminating lubricants is also avoided. These advantages are well known and PTFE valve spindles have been used for insertion into metal valve bodies. However, the coefficient of expansion of PTFE is considerably higher than the coefficient of expansion of metals such as stainless steel. There is therefore a substantial risk of leakage between PTFE spindles and metal bodies due to the differential contraction rates as the valve is cooled. This effect is considerably reduced in the valves of the invention by the use of the resilient distending means, which urges the annular segment radially outwards to maintain sealing contact with the walls of the bore.

In a valve having a spindle diameter of about 0.5 inch (1.3 cm), we prefer to space apart the banks of ports by about 4 to 6 mm, and to allow only about 6 mm of rubber tubing beyond the outermost ports. Greater lengths of rubber tubing may comfortably be used at ambient temperatures, but at elevated temperatures we prefer to restrict the length of rubber tubing to the above proportions because of the different coefficients of expansion involved. Thus because of the higher coefficient of expansion of rubber than of brass, a valve adjusted at ambient temperatures will tighten as the temperature rises. Similar problems may arise with other elastomeric materials.

The effect of the different expansion rates may also be reduced by applying the compressive force by way of a spring. Thus, for example a mandrel of increased length may be employed, and a helical spring threaded thereon so as to be compressible between a stop preferably at the outer end of the mandrel, and the elastomeric tubing, preferably with a washer inserted between the end of the spring and the tubing. The extension of the mandrel, together with the spring may extend beyond the valve body, but for most purposes this is of no consequence and this does remove any requirement for the body to be extended beyond the end of the mandrel. The compressive forces to be applied through the spring are generally not high, and a valve spindle of about 0.5 inch (1.3 cm) diameter may require only about 5–7.5 lbs/in of torque to provide an efficient seal. We found that the use of a spring produced a quite dramatic improvement in the ease of manipulation of the valve, in that increasing pressure with increasing temperature was largely eliminated.

Examples of multiple valves constructed in accordance with the present invention have been used over a temperature range of −40° to 200° C. and have maintained pressures up to 375 p.s.i. (25.8 bar) with leak rates better than $10^{-7}$ Torr $l\, s^{-1}$ ($1.3 \times 10^{-8}$ N $m\, s^{-1}$) for 19 days. Thus the present valves are particularly suited for use in the various forms of fluid analysis apparatus which generally require temperatures in the range of about 0° to 150° C. and which may require pressures up to about 250 p.s.i. (17 bar). Where the valve is to be used at elevated temperatures, the resilient distending means and the annular segment should be formed from materials for which the thermal decomposition is not severe at the temperatures involved. Thus for temperatures above about 150° C, a silicon rubber may be employed as the resilient distending means. PTFE may be used for the deformable segment up to temperatures of about 200° C.

In order that the invention may be more clearly understood, specific embodiments of the invention are described by way of illustration with reference to the accompanying drawings.

The valve illustrated in FIGS. 1 to 4 has a body comprising a cylindrical member 1, having a flange 2 at one end. Through the center of the cylindrical member 1 is a bore 3. Through the valve body are 24 radially disposed ports 4, arranged in four banks of six ports. Screw holes 5, are provided in the flange 2 for attaching the valve to a suitable mounting.

Figure 2:
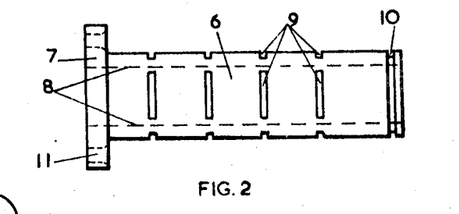
FIG. 2 is an elevation of the pliable outer layer of the spindle suitable for use in conjunction with the body of FIG. 1.

The deformable annular segment, illustrated in FIG. 2 is made from PTFE and comprises a hollow cylinder 6 with an integral flange 7 at one end. The internal surface 8 is shown dotted in the diagram. The outer surface of the cylinder 6 is provided with a number of elongated circumferential indentations 9, adapted to inter-connect selected ports and to provide a passage for the through-flow of fluid. The outer surface of the cylinder 6 is also provided with a circumferential groove 10 adapted to receive a circlip to retain the spindle within the valve body. Holes 11 for accommodating mounting screws are provided in the flange.

Figure 3:
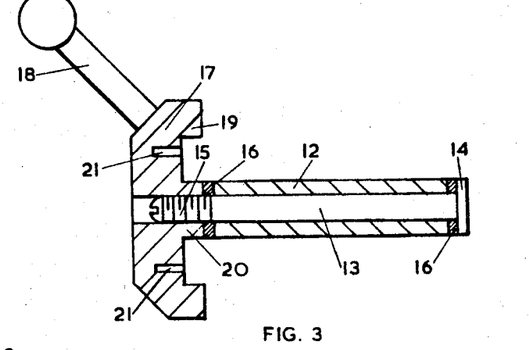
FIG. 3 is a section of a spindle core comprising a resilient distending means, adjustment means and operating means.
Figure 4:
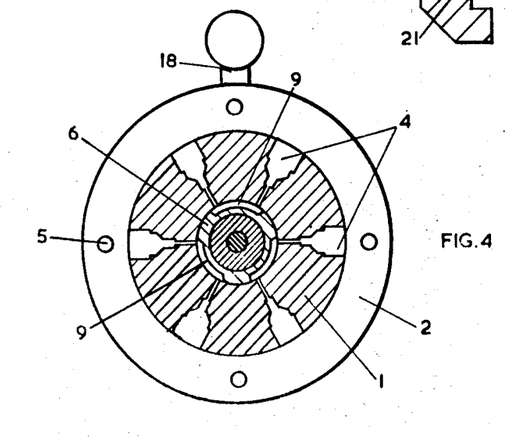
FIG. 4 is a transverse section through the assembled valve taken along the line A A of FIG. 1.

The core of the valve spindle as illustrated in FIG. 3 comprises a resilient distending means in the form of a length of rubber tubing 12 through the center of which is a mandrel 13 having an integral stop 14 at one end, and screw threads 15 at the other end. Washers 16 are provided at each end of the rubber tubing 12. An operating member 17 having an integral handle 18, and is screw threadedly engaged with the screw threads 15 of the mandrel 13. The operating member 17 also has an integral collar 19 and boss 20, and has internally threaded holes 21.

Figure 1:
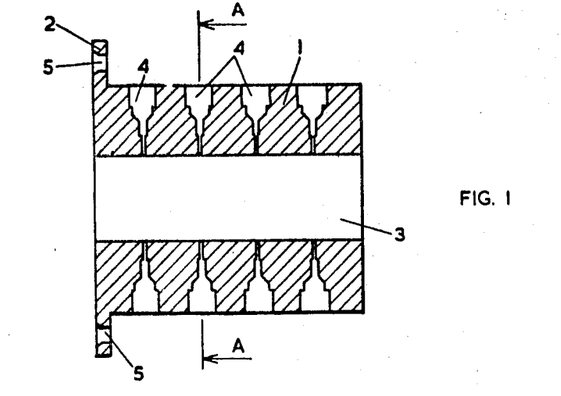
FIG. 1, is a section through the valve body of a four bank valve.

On assembly of the parts shown in FIGS. 1 to 3 the core is inserted into the spindle, such that the flange 7 is located between the boss 20 and the collar 19 to provide a firm location thereof. The spindle is attached to the core by means of screws passing through the screw holes 11 in flange 7 and engaging with the threads in the holes 21 of the operating member 17. The spindle is then inserted into the bore 3 of the valve body, and may be retained therein by means of a circlip (not shown) located in the groove 10. Rotation of the mandrel 13, e.g., by means of a screwdriver engaging with a slot in the end of mandrel 13, with respect to the operating member 17, with threads 15 engaged, enables an axial compressive force to be applied to the rubber tubing 12, thereby producing an adjustable radial distortion to the tubing 12. The tubing 12 in turn distends the pliable outer layer urging it against the walls of the bore in the valve body and provide an efficient seal thereby. Because of the resilience of the rubber tubing, the cylinder 6 of the deformable segment is biased against the bore with an even pressure, throughout its length, and thus provides an equally efficient gland seal for each bank of valve units. The valve is triple flow valve in that three adjacent pairs of ports are separately inter-connected by the indentations. There are two operating positions, firstly that shown in FIG. 4, and secondly where the spindle is rotated through an angle of 60° C. thus inter-connecting each port to its other adjacent port. Rotation of the spindle through an angle of 30° C. will effectively close all the ports, but because of the small distance between adjacent indentations, there may be some leakage in a small valve in such a position. Furthermore, in the valve illustrated there may be a tendency for the PTFE outer layer to creep into the three ports which are not aligned with the indentations when in the closed position. It is therefore preferable when a closed position is required, to employ further banks of ports each bank thus containing less ports and to provide blind indentations for alignment with closed ports.

Figure 5:
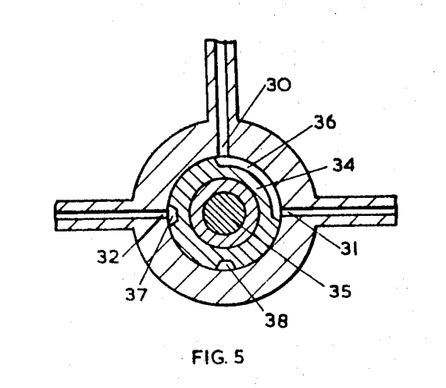
FIG. 5 is a transverse-section of one bank of a two-way valve with the parts shown in a first position.
Figure 6:
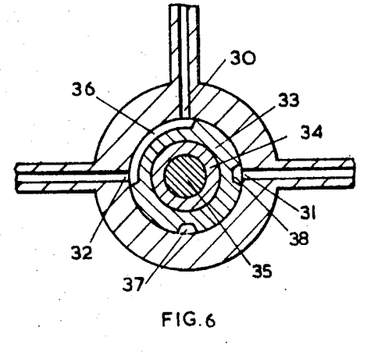
FIG. 6 is a transverse-section through the same valve as that shown in FIG. 5 with the part in the second position.

In the multiway stop-cock illustrated in FIGS. 5 and 6 a cross-section is shown through one of the banks and this has three ports 30, 31 and 32 and is adapted to provide inter-connection between a first port 30 and a second port 31, or inter-connection between the first port 30 and a third port 32, or all ports closed. The spindle comprises a deformable annular segment of PTFE 33 supported on a length of rubber tubing 34 through which is located a mandrel 35 in essentially the same manner as that illustrated in FIG. 4. The PTFE outer layer is provided with an elongated indentation 36 for inter-connecting the port 30 with the selected port 31 or 32, and blink indentations 37 or 38 for alignment with the non-selected port. FIGS. 5 and 6 illustrate the valve with the first port 30 inter-connected with ports 31 and 32 respectively. Rotation of the spindle through a further 90° C. provides a closed position with an indentation aligned with each of the ports, but without inter-connecting any other ports. Where no closed position is required, the blind indentations 37 and 38 may be formed from a single elongated indentation.

Figure 7:
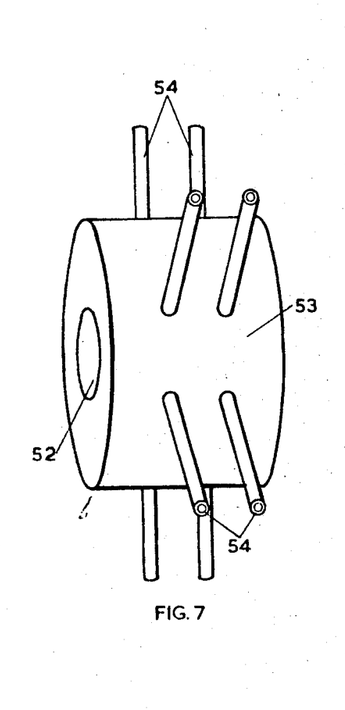
FIG. 7 is an isometric view of a two bank valve body.
Figure 8:
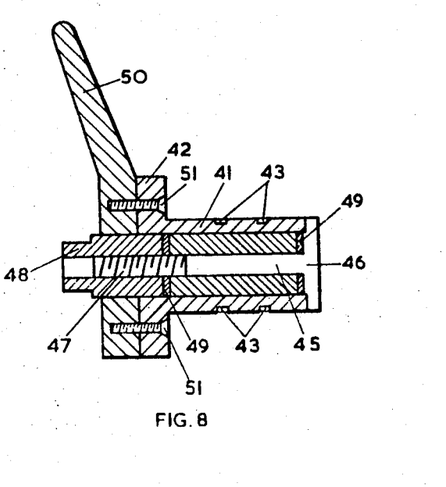
FIG. 8 is a section through a valve spindle adapted to be located within the valve body shown in FIG. 7.

The valve illustrated by FIGS. 7 and 8 has the same essential features as the valve illustrated in FIGS. 1 to 4 except that only two banks of valve units are provided. The spindle illustrated in FIG. 8 comprises a deformable annular segment of PTFE 41 having a flange 42 at one end and being provided with indentations 43. The distending means is a length of rubber tubing 44, and is mounted on a mandrel 45 having an enlargement 46 at one end and being screw threaded 47 at the other end. A boss 48 is internally screw threadedly engaged with the mandrel 45. Washers 49 are provided at each end of the rubber tubing. An operating member 50 is attached to the flange 42 by means of screws 51. The spindle shown in FIG. 8 is adapted to be located within the bore 52 of the valve body 53. Connecting tubes 54 communicate with the bore 52 through ports (not shown). The valve was designed for use in a gel permeation chromatographic apparatus.

Figure 9:
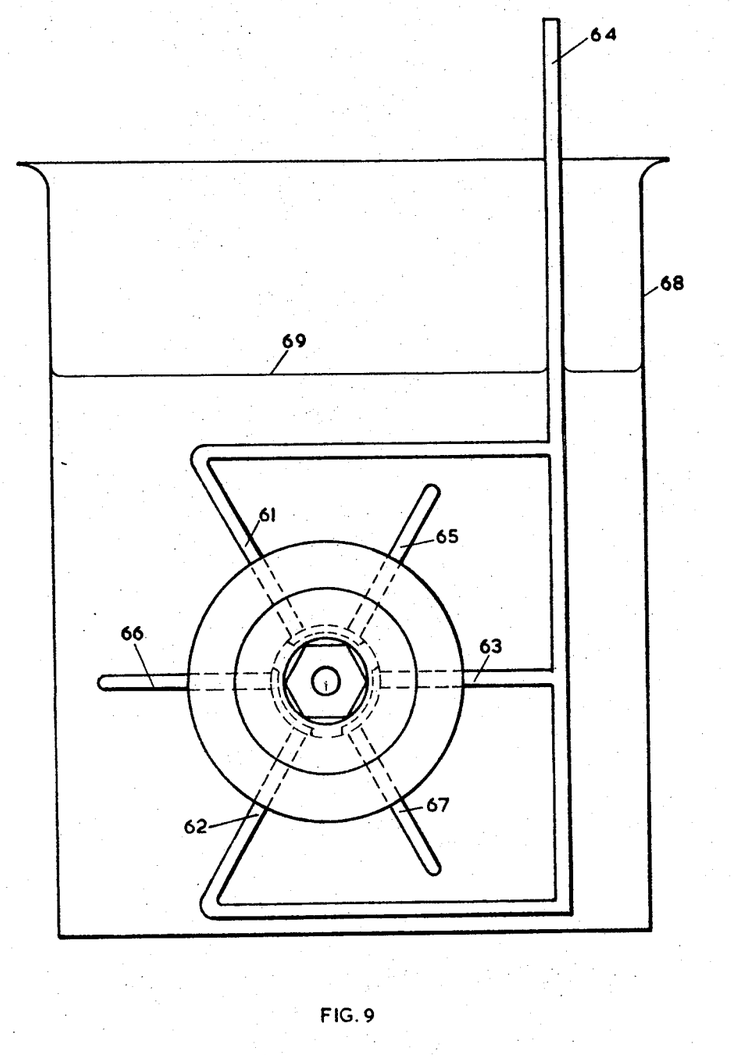
FIG. 9 is an illustration of the valve of FIGS. 7 and 8 undergoing testing for leakages under pressure.

The valve shown in FIGS. 7 and 8 was tested for gas tightness using a Bubble Test as described by J. Biram and G. Burroughs (Vacuum, 14, 221–226, 1964). Each bank of ports was tested separately, the ports of the other bank being left open. The apparatus is shown diagrammatically in FIG. 9. Alternate ports 61, 62 and 63 were connected to a high pressure hydrogen line 64, the remaining ports 65, 66 and 67 being blanked off. The valve was then inserted into a beaker 68 and immersed in methanol where the level is indicated as 69. Hydrogen was then applied to the valve as a pressure of 50 p.s.i. (3.4 bar) which was then increased gradually to a pressure of 375 p.s.i. (25.8 bar), when small bubbles appeared from the base of the valve. Further axial pressure was then applied to the rubber tubing 44 by rotation of the boss 48, whereupon the bubbles ceased to appear, no bubbles being observed for 45 minutes. The valve spindle was then rotated through 60°, and observation kept for 10 minutes. No bubbles were observed. The spindle was then returned to its original position and no bubbles occurred during the next 95 minutes. The spindle was then returned to the alternative position by rotating through 60°, and observation was continued for a further 120 minutes. No bubbles were formed. The leak rate was calculated in the manner described by Biram and Burroughs in the above article, and it was concluded that the leak rate at a pressure of 375 p.s.i. (25.8 bar) was better than $1 \times 10^{-7}$ Torr $l\,s^{-1}$ ($1.3 \times 10^{-8}$ N $m\,s^{-1}$).

The same valve was then tested for leaks under vacuum by the method described in Leybold Vacuum Catalogue of January 1965. The apparatus used is that shown in FIG. 10, and the same valve was employed as in the previous test. The valve 71 was connected to a one liter vessel 72 via a glass stop-cock 73 lubricated with grease, which was connected to one of the ports 74, the remaining ports of the bank tested being blanked off while the ports of the other bank are left open. The pressure in the vessel 72 was measured by a Pirani gauge 75, attached thereto by a ground glass joint. A further exit from the vessel 72 was sealed by a second grease-lubricated ground glass stop-cock 76. The vacuum was provided by a mercury vapor pump backed by a rotary oil pump, producing an ultimate vacuum better than $1 \times 10^{-4}$ Torr ($1.3 \times 10^{-2}$ Pa).

Figure 10:
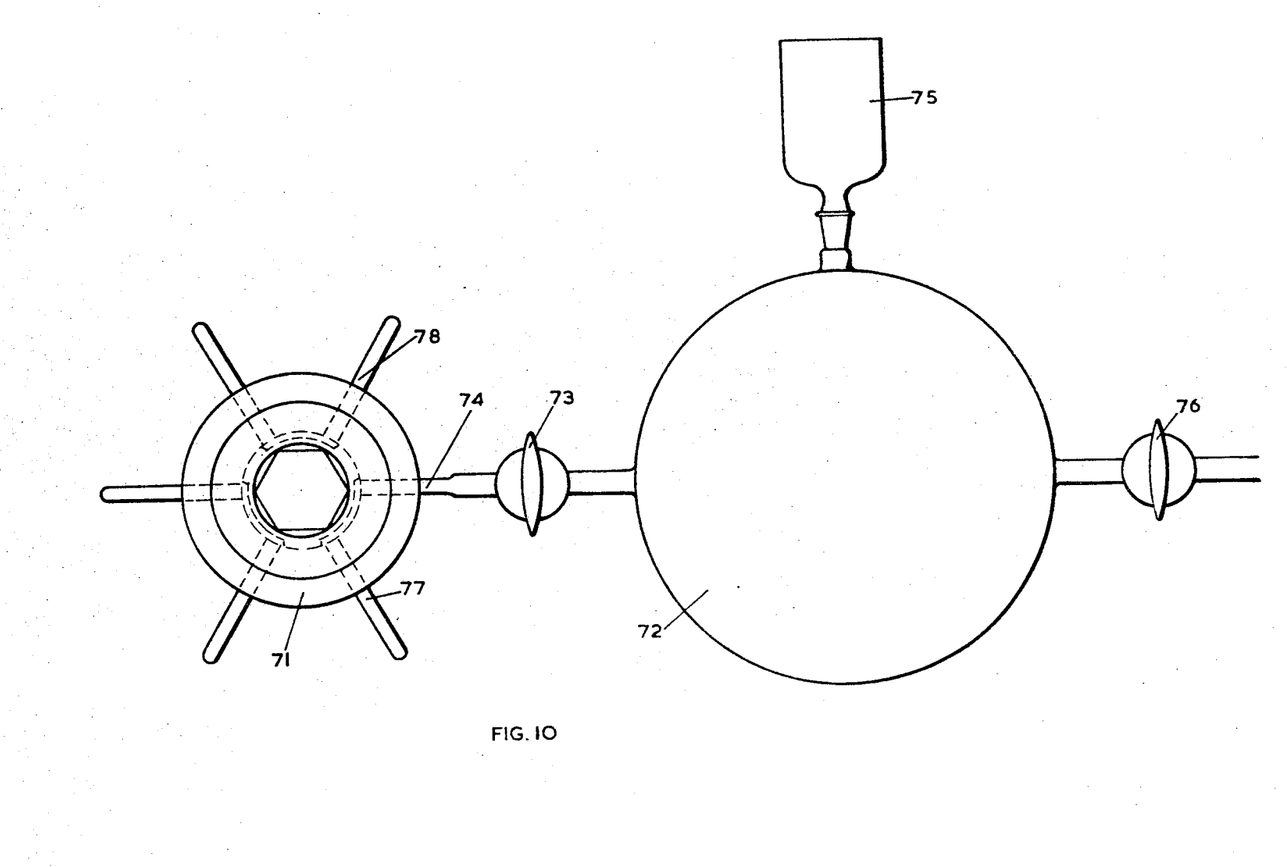
FIG. 10 shows the same valve undergoing testing for leakages under vacuum.

With the first stop-cock 73 open the system was evacuated through the second stop-cock 76. The second stop-cock was then closed and the time taken for the Pirani gauge to indicate the rise in pressure from $1 \times 10^{-4}$ to $2 \times 10^{-4}$ Torr ($1.3 \times 10^{-2}$ to $2.7 \times 10^{-2}$ Pa) was recorded. This was repeated, and from these times the leakage rate $Q$ was calculated using the formula $$Q = \frac{(P_2 - P_1)V}{T} \text{ Torr } 1s^{-1}$$

where $P_1$ is the initial pressure (Torr), $P_2$ is the final pressure (Torr), $V$ is the volume of the system liters and $T$ is the time (secs).

It was found necessary to pump the valve for several days to de-gas the PTFE/metal valve. After 5 days, the de-gassing appeared to be complete and the tests were commenced. No form of heating had been applied to the valve during the 5 days, although heat should have helped to speed up the de-gassing. The valve was arranged as indicated in FIG. 10, with the first port 74 connected to a second port 77 which was blanked off. On commencing the tests, the second stop-cock was closed. Readings were taken off the Pirani gauge and the time was recorded for the pressure to rise from $1 \times 10^{-4}$ Torr to $2 \times 10^{-4}$ Torr ($1.3 \times 10^{-2}$ to $2.7 \times 10^{-2}$ Pa). Three evaluations were carried out and the times were 600, 615 and 610 seconds giving a leak rate of $1.6 \times 10^{-7}$ Torr $l\,s^{-1}$ ($2.1 \times 10^{-8}$ N $m\,s^{-1}$) in each case. The valve spindle was then rotated through 60°, so that the first port 74 was inter-connected to a third port 78, and three more measurements were taken. The results were 620, 590, and 620 secs, representing leak rates of $1.6 \times 10^{-7}$, $\times 10^{-7}$ and $1.6 \times 10^{-7}$ Torr $l\,s^{-1}$ ($2.1 \times 10^{-8}$, $2.3 \times 10^{-8}$ and $2.1 \times 10^{-8}$ N $m\,s^{-1}$) respectively. The system was tested over the following 19 days, during which time the leak rate improved to $1.2 \times 10^{-7}$ Torr $l \times s^{-1}$ ($1.6 \times 10^{-8}$ N $m\,s^{-1}$) showing that the valve was still not fully de-gassed on the commencement of the tests. No allowance was made in these results for the leak rate of the two greased glass stop-cocks and the ground glass joint to the Pirani gauge.

Figure 11:
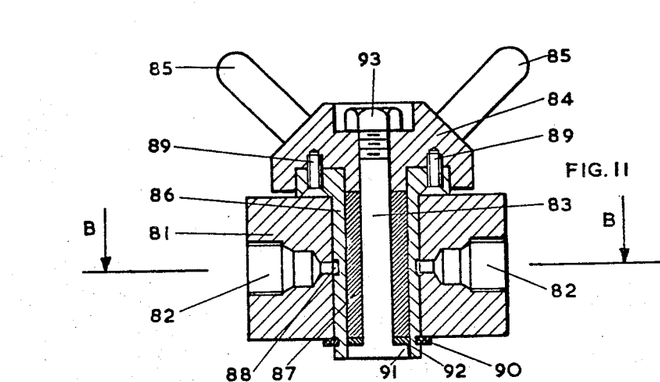
FIG. 11 is a section through a two way valve having only a single bank of ports.
Figure 12:
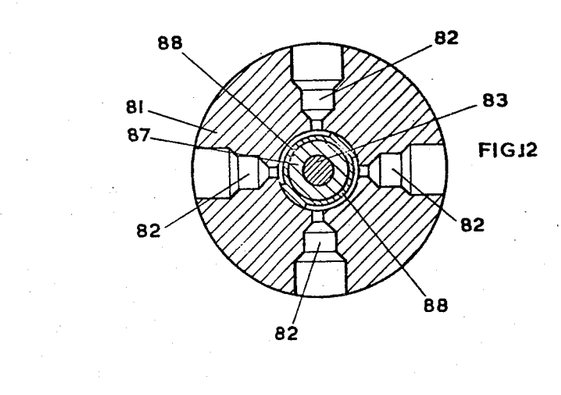
FIG. 12 is a transverse-section along the line B B of FIG. 11.

The valve illustrated in FIGS. 11 and 12 comprise a stainless steel body 81 having four ports 82 being coplanar so as to form a single bank. The ports are adapted at their outer ends to be secured to conduit pipes by screw fittings. The spindle has a central brass mandrel 83 passing freely through a brass boss 84 having operating handles 85. The deformable segment 86 of the spindle is formed from glass-filled PTFE containing approximately 25 percent by weight of glass, and the segment is distended by a length of rubber tubing 87, mounted on the mandrel 83. Flow passages are provided by two indentations 88 formed in the deformable segment 86 and arranged in the same transverse plane as the ports 82. The boss is secured to the pTFE segment 86 by means of screws 89 and the spindle is retained within the body 81 by a circlip 90 located in circumferential grooves provided therefor in the segment 86. The mandrel 83 has an enlargement 91, and a washer 92 is provided between the enlargement and the rubber tubing 87. A nut 93 engages the end of the mandrel remote from the enlargement.

The valve is assembled as illustrated in FIG. 11, and the nut 93 is rotated to compress the rubber tubing 87 between the boss 84 and the washer 92 retained by the enlargement 91. As described for the previous valves, the PTFE segment 86 is thereby outwardly biased into sealing engagement with the inner surface of bore 81. With the spindle oriented as shown in FIG. 12, the ports are connected in pairs by alignment with the two indentations, each indentation providing a separate flow passage sealed from the other. Rotation of the spindle through 90° realigns the indentations with different ports so that each port is joined with its adjacent port on its other side, in substantially the same manner as the six-port bank illustrated in FIG. 4.

Figure 13:
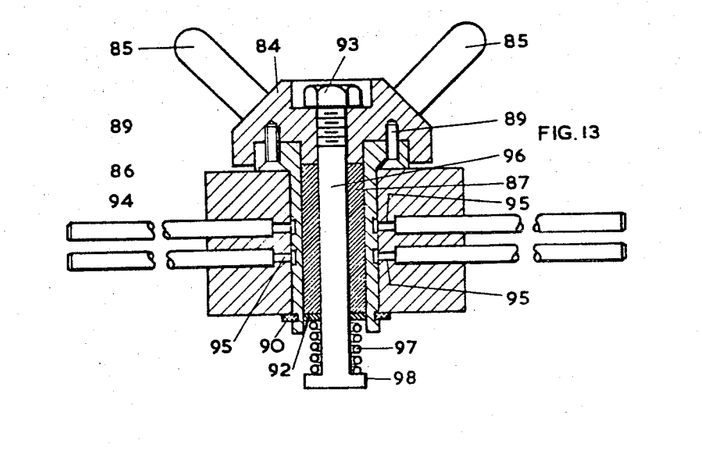
FIG. 13 is a section through a two bank valve having the compressive force applied through a spring.

The valve illustrated in FIG. 13 and has two banks of four ports, the conduit pipes being sweated into the body. This enables the ports to be arranged closer together than is possible where screwed connections are used. In the valve of FIG. 13, the ports are about 6 mm between centers. However, the valve is generally similar to that illustrated in FIG. 11, and the same reference numerals have been used for the parts which are interchangeable.

The valve illustrated in FIG. 13 comprises a stainless steel body 94 having two banks each of four ports 95. A spindle is rotatably mounted within the body, and comprises a mandrel 96 slidably mounted at one end within a boss 84 and supporting a length of rubber tubing 87 within a glass-filled PTFE annular segment 96 connected to the boss by two screws 89 : operating handles 85, an adjusting nut 93, a washer 92 and a circlip 90 are also provided as before. The mandrel 96 is however, longer than that used in the valve of FIG. 11, and a compression spring 97 is interposed between the enlargement 98 at the end of the mandrel and the end of the rubber tubing. The spring is coaxial with the mandrel.

To make the seal, the nut is again rotated to draw the enlargement of the mandrel towards the rubber. In the valve illustrated in FIG. 13, which has a 19 mm diameter spindle and a nut 93 tapped with a British Association size O thread, a good seal is achieved by applying to the nut a torque of only 5 to 7.5 lb inch ($5.7 \times 10^{-2}$ to $8.6 \times 10^{-2}$ kg m), the spring being chosen to be within its compresssible range under such conditions. When we applied a torque within the above range, we found that the spindle could easily be turned within the body for operation of the valve while maintaining an efficiently sealing engagement between the spindle and the body. When using the valve at elevated temperatures of about 150° C, we found that there was no noticeable increase in stiffness of the valve during its operation. This is in contrast to the valve shown, for example, in FIG. 11, which may become considerably stiffer to operate as the temperature is raised, which stiffness could be reduced again without loss of seal by adjustment of the distending means.

The valve shown in FIGS. 14 to 19 was designed for a specific analytical apparatus to carry out a complex switching operation in a single action, and illustrates how diagonal indentations may be employed to advantage.

The valve has a stainless steel body 101 which is provided with nine radial ports shown numbered 1 to 9 in the FIGS. 14 to 19. The ports are arranged in eight equidistant transverse planes spaced along the valve, and in order that this may be more easily understood, FIG. 14 has eight vertical broken lines enscribed upon it, each line representing a transverse plane. The planes are also numbered according to the port or ports lying within them, the end plane containing ports 8 and 9, the other planes each containing only one port.

Figures 14, 15, 16, 17:
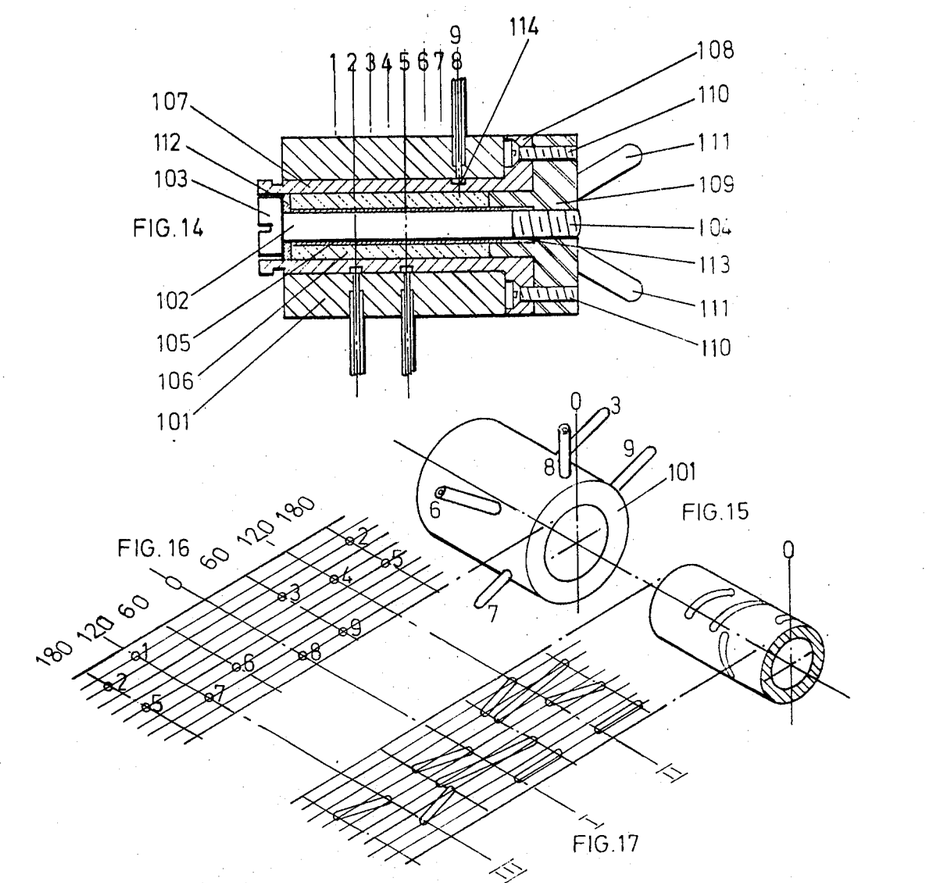
FIG. 14 is a section through a complex valve having nine ports arranged in eight separate transverse planes.
FIG. 15 is an exploded view of the body and the deformable annular segment of the spindle.
FIG. 16 is a drawing of the surface of the bore unrolled to show the position of the ports as viewed towards the central axis of the body, the valve being that shown in FIG. 15.
FIG. 17 is similarly a drawing f the deformable annular segment of the spindle, unrolled to show the position of the indentations.

The spindle has a mandrel 102 having a head 103 at one end and a screw thread 104 at the other. Located coaxially about the mandrel are an inner PTFE sleeve 105 encompassed by a length of rubber tubing 106 which in turn supports a glass-filled PTFE annular segment 107. The segment 107 has a flange 108 at one end, secured to a brass nut 109 by screws 110, the nut 109 engaging the screw thread 104 of the mandrel. The nut 109 is provided with operating handles 111, and a washer 112 is interposed between the head 103 of the mandrel and the rubber tubing 106.

FIG. 14 shows the valve in its relaxed state, there being a gap 113 at one end of the inner PTFE sleeve 105. As in the other valves described above, the seal between the outer layer and the body is formed by applying a longitudinal compressive force on the rubber tubing, and this is done in the present valve by rotating the mandrel so as to reduce its effective length by screwing it into the nut 109. The inner PTFE sleeve is thus provided in order to reduce the transmission of torsional forces from the mandrel to the rubber during adjustment. As the mandrel is effictively shortened, the inner PTFE sleeve progressively fills the gap 113.

The outer surface of the spindle has nine diagonal and circumferential indentations 114, and their arrangement is illustrated in FIGs. 15 and 17. The relative positions of the ports are illustrated in FIGS. 15, 16 and 18, in which FIG. 16 shows the body unrolled and viewed towards the axis so that FIGS. 16 and 17 may be superimposed and FIG. 18 shows the positions of the radial ports when viewed form the end having the nut 109.

There are three basic operating positions spaced apart by 120°, and these are indicated on the drawings by the numerals I, II, and III. In each of the drawings, the three positions are show with respect to a stationary body having port 8 extending along the reference line 0° and ports 2 and 5 extending outwardly at 180°. The other ports are located as shown in FIGS. 16 and 18.

Figure 19:
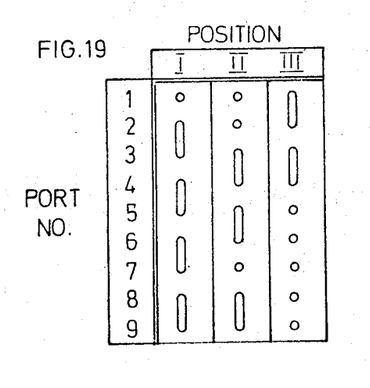
FIG. 19 is a table illustrating diagrammatically the ports which are interconnected by the indentations in the spindle surface.

In position I, the outer layer of the spindle as shown in FIG. 17 is superimposed on the ports of FIG. 16 so that the reference line 0° is in line with the position indicator I of FIG. 17, i.e., in the positions as drawn. FIG. 19 is the key to the interconnection of the ports. Thus in position I, port 1 is isolated while ports 2 and 3, 4 and 5, 6 and 7, 8 and 9 are interconnected in their respective pairs.

Figure 18:
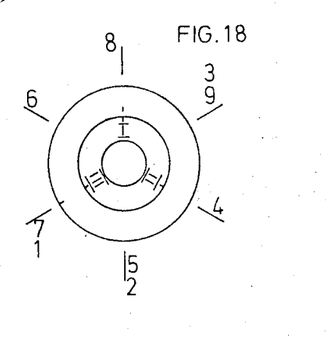
FIG. 18 is a diagrammatic representation of the complex valve viewed from one end showing the orientation of the ports.

To obtain position II, the spindle is rotated through 120° so that the reference markings II shown in FIGS. 17 and 18 are brought into alignment with the reference line 0°. The indentations will then interconnect ports 3 and 4, ports 5 and 6, ports 8 and 9 isolating ports 1, 2 and 7 as shown in FIG. 19.

To obtain position III, the spindle is rotated through a further 120°, so that port 1 is connected to port 2, port 3 connected to port 4 with ports 5 to 9 all isolated.

The valve was initially tested at ambient temperatures with only those indentations shown in FIG. 17. However, before testing at elevated temperatures was commenced, circular blind indentations were provided for alignment with the closed ports so as to prevent creep of the PTFE into the respective closed ports. These blind indentations are represented by an o in FIG. 19, but have been omitted from FIG. 17 for the sake of clarity. Even though blind indentations are not essential at low and ambient temperatures, we prefer to provide them as slow creep of the PTFE into the ports may still be damaging if the valve is left in one position for long periods.

Figure 20:
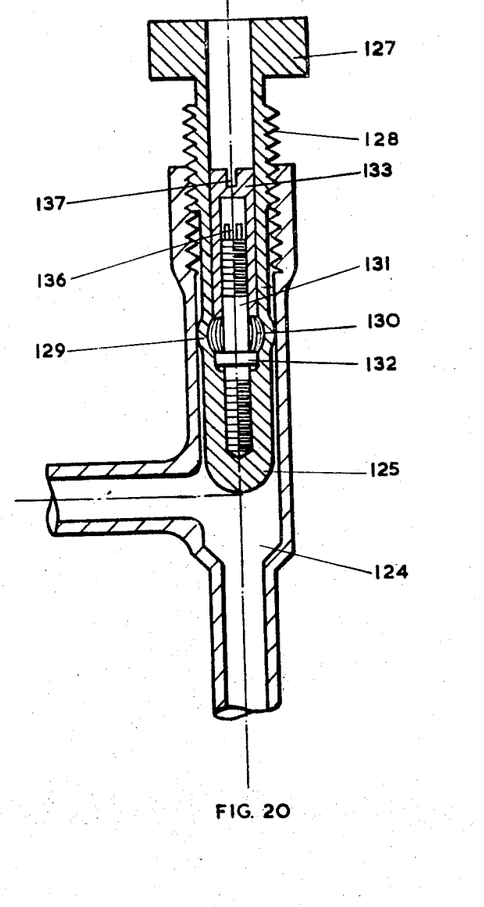
FIG. 20 is a section through a nose-operated valve.
Figure 21:
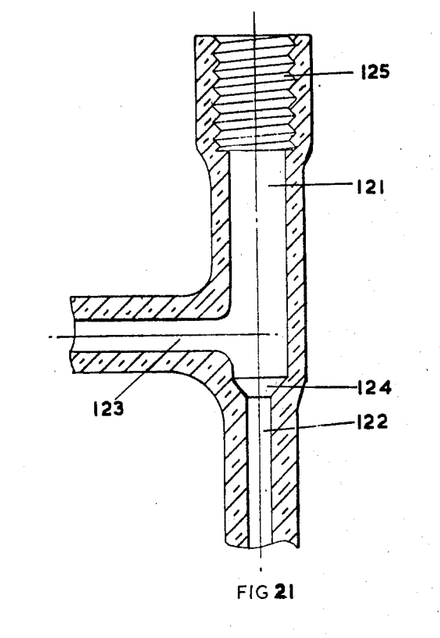
FIG. 21 is a section through the body of the valve illustrated in FIG. 20.

The nose-operated valve illustrated in FIG. 20 comprises a valve body having a bore, and a hollow spindle slidably located in the bore. The general form of the valve body shown in FIG. 21 is we-l known, having two ports 122, 123, a valve seat 124 being provided in the flow-passage connecting the two ports. The end of the body remote from the seat is internally threaded 125, the body being formed of glass.

Figure 22:
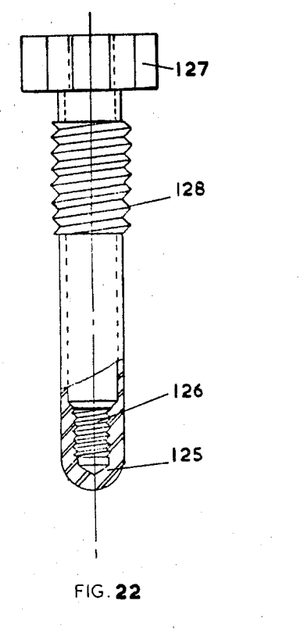
FIG. 22 is a partial section through a PTFE valve spindle which screws into the valve body illustrated in FIG. 21.

The hollow spindle illustrated in FIG. 22 was machined from PTFE, and has a nose 125 internally screw-threaded 126, the end remote from the nose being enlarged to form a boss 127 to assist in operation of the valve, and screw threads 128 for engagement with the screw threads 125 of the body. The spindle has sufficiently thin walls to allow an annular segment 129 to be outwardly distended to contact the bore walls.

Figure 23:
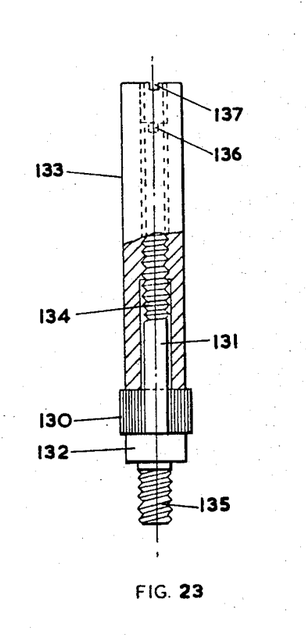
FIG. 23 is a partial section through an expanding device which when inserted in a valve spindle as shown in FIG. 22 may cause the sides of the spindle to be radially distended.

The remainder of the sealing means is the expanding device illustrated in FIG. 23, and comprises a distending means in the form of a length of rubber tubing 130, and adjustment means. The adjustment means comprises a mandrel 131 having an enlargement 132 and an adjustable sleeve 133 engaging the mandrel by means of screw threads 134. The mandrel has a threaded extension 135 for engagement with the screw threads 126 of the nose. Slots 136, 137 are provided in the mandrel and the sleeve to accept a screwdriver for assembly and adjustment respectively of the device. Alternatively the sleeve may be extended out of the end of the spindle, and provided with a boss or similar enlargement to facilitate manual adjustment.

The valve is assembled by inserting the expanding device into the spindle and engaging the screw threads 135, 126 of the mandrel extension and nose. The spindle may then be inserted into the valve body to form the assembly illustrated in FIG. 20, and the sleeve rotated so as to compress the rubber tubing 130 longitudinally causing radial distension thereof which in turn causes an annular segment 129 to be distended radially outwards against the bore wall and form the gland seal. The valve is closed in conventional manner by occlusion of the valve seat 124 by the spindle nose 125.

Figure 24:
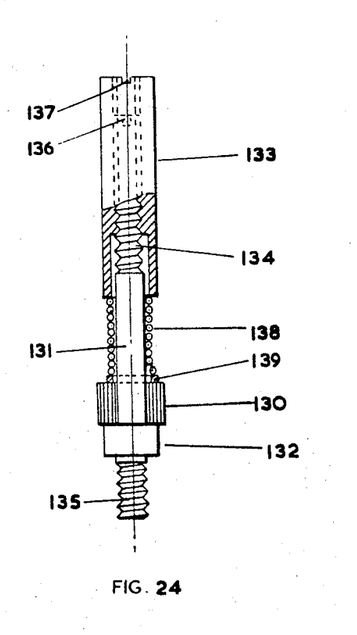
FIG. 24 is a partial section through another expanding device for use as an alternative to that of FIG. 23.

The expanding device illustrated in FIG. 24 has the compressive force applied through a spring 138. A washer 139 is also provided between the spring 138 and the rubber tubing 130, and a washer may similarly be placed with advantage between the sleeve 133 and the rubber tubing 130 of the device of FIG. 23. In all other respects the various features are common to both devices, and like numerals are used for like parts.

Figure 25:
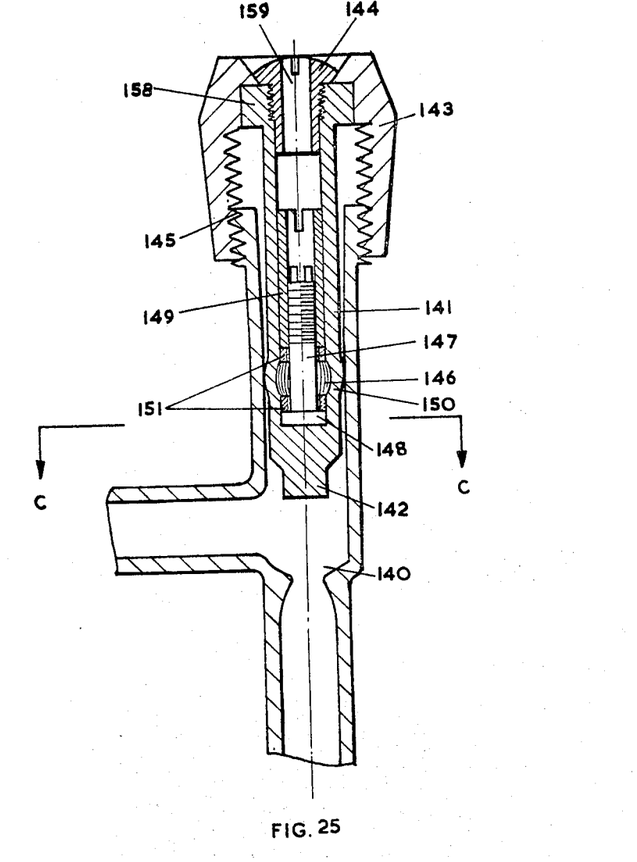
FIG. 25 is a section through a nose-operated valve essentially similar to that shown in FIG. 20, but employing alternative means of engaging the mandrel and nose.
Figure 27:
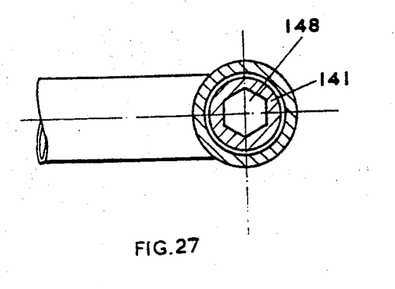

The valve illustrated in FIGS. 25 and 27 are essentially the same as that shown in FIG. 20, the differences being in structure rather than function. The valve body similarly has a valve seat 140 co-axial with the bore. Slidably located in the bore is a hollow PTFE spindle 141 having a nose 142 at one end and a cap 143 secured to the other end by a screw 144. The cap 143 adjustably engages the body by the screw threads 145.

Figure 26:
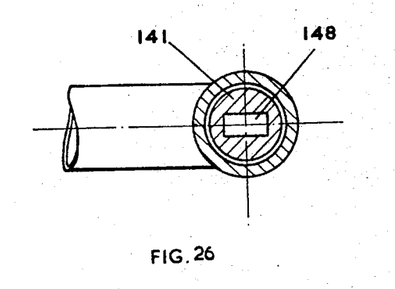
FIGS. 26 and 27 are transverse sections along the line CC of FIG. 25, illustrating alternative mandrel enlargement shapes.

The expanding device again comprises a short length of rubber tubing 146 mounted on a mandrel 147 having an enlargement 148, an adjustable sleeve 149 threadedly engaging the mandrel to provide the adjustable distension of the rubber 146 and consequently of the annular segment 150. Washers 151 are provided on either side of the rubber tubing 146. In contrast to the valve of FIG. 20, there is no extension of the mandrel, but alternative means for engaging the nose are provided so as to prevent rotation of the mandrel during adjustment of the sealing means. In this case the enlargement 148 is non-circular, and is inserted in a correspondingly shaped hole therefore in the nose. FIGS. 26 and 27 illustrate two suitable shapes, but many variations are possible. While we prefer symmetrical enlargements in that they more evenly distribute the stresses applied during adjustment, asymmetrical engagement means may be used if desired. For example a pin parallel to the axis of rotation but displaced therefrom may be inserted into a correspondingly displaced hole, and such means are relatively simple to manufacture.

Figure 28:
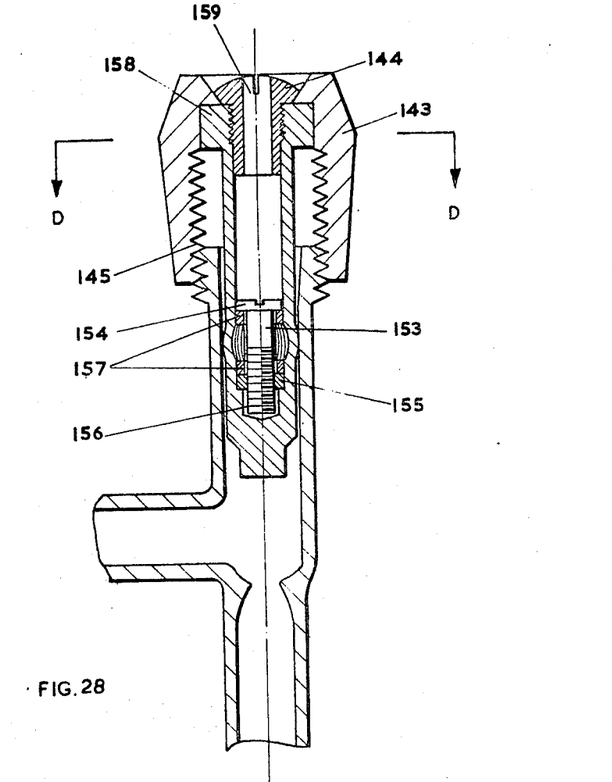
FIG. 28 is a section through a nose-operated valve illustrating an alternative adjustment means.

The valve illustrated in FIG. 28 is identical to that shown in FIG. 25 except in respect of the expanding means which comprises a bolt 153 forming the mandrel, with the head 154 of the bolt providing the enlargement, and the compression member being in the form of a hexagonal nut 155 located in a hexagonal hole provided therefore in the nose. A further hole 156 is provided in the nose to freely receive the end of the bolt 153 as it emerges from the nut 155. The distension is adjusted by rotation of the bolt 153 while the nut 155 is prevented from rotating by virtue of its engagement with the nose. Washers 157 are provided to reduce the transmission of torsional stresses to the rubber, and thence to the relatively thin-walled PTFE spindle, when the bolt 153 is rotated during adjustment.

Figure 29:
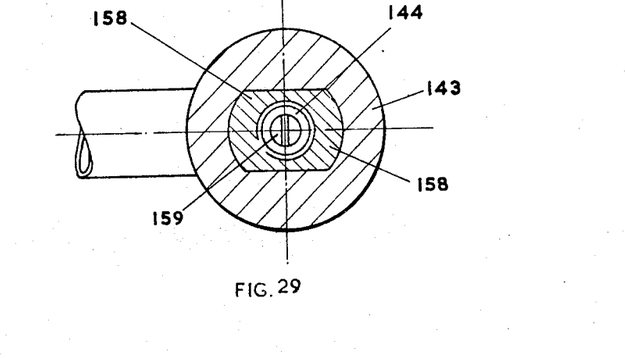
FIG. 29 is a transverse section along the line DD of FIG. 28.

The upper end of the spindle, together with it cap is the same in both the valves of FIGS. 25 and 28. Thus while FIG. 29 has been described as a transverse section on a line in FIG. 28, this is equally a corresponding section of the valve of FIG. 25 and the same numerals have been employed. In the two valves, the upper end of the PTFE spindle is provided with two shoulders 158 for providing a key with the cap 143. The cap is then retained on the spindle by the brass screw 144 having a bore 159 therethrough. The purpose of the bore 159 is to allow the insertion of a screwdriver to adjust the sealing means, without the necessity of first removing the screw 144.

A valve having a gland seal according to the invention will perform satisfactorily with pressures above and below atmospheric. When vacuum is applied, pressures below $10^{-4}$ Torr are readily obtainable with a leak rate considerably less than $10^{-4}$ Torr $l^{-1}$ sec$^{-1}$ ($10^{-5}$ N m s$^{-1}$), and leak rates of the order $10^{-1}$16 7 Torr $l^{-1}$ sec$^{-1}$ ($10^{-8}$ N m s$^{-1}$) may be achieved with care.

We claim:

1. A valve having a closable passage for conveying fluid therethrough, and comprising a valve body having an annular bore and a valve spindle formed from a chemically inert polymer slidably located in said annular bore, the spindle having a closure portion comprising a portion of the outer surface of the spindle which is arranged to close said passage, and sealing means for providing a seal between the spindle and the annular bore, the sealing means comprising a radially deformable outer annular segment of the spindle, distending means within said annular segment for adjustably distending it radially outwards to contact the bore wall and form a seal, said closure portion and said annular segment being relatively positioned such that said closure portion is isolated from the distending means by said seal so as to prevent contamination of said distending means by the fluid, and adjustment means comprising compression means located axially on both sides of the distending means, and a mandrel interconnecting the compression means whereby the distance between the compression means is adjustable for applying an axial compression to the distending means and effecting a consequential radial distension.

2. A valve spindle of a chemical inert polymer slidably located in an annular bore in a valve body according to claim 1, said valve body having a valve seat, said spindle having a solid nose portion at one end thereof engaging said valve seat in said valve body to prevent passage of a fluid medium through said valve seat when the valve is closed, and sealing means providing a gland seal between said spindle and the annular bore of said valve body, said sealing means comprising
 a radially deformable outer annular segment of said spindle,
 a hollow portion within said spindle having an opening only at the end of said spindle remote from said nose portion,
 distending means within at least part of said hollow portion of said spindle for distending said outer annular segment radially outwards to contact said annular bore wall of said valve body to form a gland seal, said outer annular segment being positioned in said bore between the fluid medium to be sealed by the gland seal and the opening of said spindle so that said outer annular segment prevents said fluid medium from entering said opening so that the said fluid medium does not contact said distending means, and
 adjusting means comprising a mandrel and an adjustable sleeve engaging with said mandrel,
said distending means being distendable by movement of said sleeve whereby adjustment of said sleeve with respect to said mandrel towards said distending means effects axial compression, and consequential radial distension of said distending means,
said adjusting means being adjustably operable through said spindle opening so that it is adjustable from outside of said spindle without disturbing the effectiveness of the operating gland seal.

3. A valve spindle according to claim 2 in which the distending means comprises a length of elastomeric tubing which is coaxially mounted on the mandrel.

4. A valve spindle according to claim 2 in which the mandrel is provided with an integral enlargement, the distending means being located between said enlargement and the adjustable sleeve.

5. A valve spindle according to claim 2 in which one end of the mandrel has engagement means which engage with the nose portion whereby rotation of the mandrel with respect to said nose portion during adjustment of the adjustable sleeve is prevented.

6. A valve spindle according to claim 5 in which the engagement means comprises a screw thread which engages with a corresponding screw thread in the nose portion.

7. A valve spindle according to claim 2 in which the chemically inert polymer is a fluorine-containing polymer.

8. A valve spindle according to claim 7 in which the fluorine-containing polymer contains a polytetrafluoroethylene.

9. A valve according to claim 1 comprising a valve spindle of a chemically inert polymer slidably located in an annular bore of a valve body having a plurality of radially disposed ports communicating with the bore, said spindle having a sealing means comprising
 a radially deformable outer annular segment of said spindle encompassing a hollow portion having an opening at at least one end,
 resilient distending means within at least part of said hollow portion of the spindle for resiliently distending said annular segment radially outwards to contact the annular bore wall of the valve body and form a seal, and
 adjustment means comprising compression means located axially on both sides of the distending means, and a mandrel interconnecting the compression means whereby the distance between the compression means is adjustable for applying an axial compression to the distending means and effecting a consequential radial distension, said adjustment means being adjustably operable from outside said spindle without disturbing the effectiveness of the operating seal,
said outer annular segment having at least two identations disposed to provide independent fluid flow-passages for inter-connecting selected ports.

10. A valve according to claim 9 in which the resilient distending means comprises a length of elastomeric tubing which is co-axially mounted on the mandrel.

11. A valve according to claim 9 in which the mandrel is provided with an integral enlargement, the distending means being located between said enlargement and the adjustable compression member.

12. A valve according to claim 9 in which the compression member comprising a sleeve co-axially engaging the mandrel by means of screw threads.

13. A valve according to claim 9 in which a compression spring is co-axially mounted on the mandrel, whereby the compressive force axially compressing the distending means is applied through said spring.

14. A valve according to claim 9 in which the valve body has a plurality of ports disposed both along and around the body, the surface of the radially deformable annular segment having a plurality of indentations, each capable of being aligned with two or more of the ports simultaneously.

15. A valve according to claim 14 having at least two banks radially disposed ports, each bank comprising at least two of said ports, and the surface of the annular segment of the spindle being provided with indentations disposed to provide flow passages for inter-connecting selected ports of the same bank, the indentations associated with any one bank of ports being separated from the indentations associated with any other bank of ports by the outer surface of the segment forming a seal in the bore between the banks of ports.

16. A valve according to claim 14 in which the valve body has at least four transverse planes spaced along said body, each plane containing one or more ports.

17. A valve according to claim 14 in which the indentations comprise channels arranged to take the shortest path between two ports interconnected thereby.

18. A valve according to claim 9 in which the pliable outer layer is formed from a fluorine-containing polymer.

19. A valve according to claim 18 in which the fluorine-containing polymer is polytetrafluoroethylene.

* * * * *